United States Patent
Mo et al.

(10) Patent No.: US 7,630,937 B1
(45) Date of Patent: Dec. 8, 2009

(54) METHOD AND SYSTEM FOR PROCESSING A FINANCIAL TRANSACTION

(75) Inventors: See Yew Mo, Mountain View, CA (US); Harish Krishnan Subramanian, Mountain View, CA (US); Michael Power, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 12/112,766

(22) Filed: Apr. 30, 2008

(51) Int. Cl.
*G06Q 99/00* (2006.01)
(52) U.S. Cl. .............................. 705/39; 705/34; 705/40
(58) Field of Classification Search .................... 705/34, 705/40
See application file for complete search history.

(56) References Cited

U.S. PATENT DOCUMENTS

2002/0026394 A1* 2/2002 Savage et al. ................. 705/34
2008/0005021 A1* 1/2008 Brown et al. .................. 705/40

OTHER PUBLICATIONS

Richard J. Sullivan, Risk Managament and Nonbank Participation in the U.S. Retail Payments System, Second Quarter 2007, Economic Review-Federal Reserve Bank of Kansas City, v92, n2, p. 5-40.*

* cited by examiner

*Primary Examiner*—Mary Cheung
*Assistant Examiner*—Behrang Badii
(74) *Attorney, Agent, or Firm*—Osha • Liang LLP (57) ABSTRACT

A method for performing a financial transaction that includes identifying a plurality of payment options associated with a payer executing the financial transaction, wherein each of the plurality of payment options is linked to a financial account of the payer, obtaining cost data and benefit data for each of the plurality of payment options, wherein the cost data includes a cost of using the payment option for the financial transaction and the benefit data includes a benefit of using the payment option for the financial transaction, selecting a preferred payment option from the plurality of payment options for the financial transaction based on the cost data and the benefit data, and processing the financial transaction using the preferred payment option to obtain a transaction confirmation.

13 Claims, 7 Drawing Sheets

METHOD AND SYSTEM FOR PROCESSING A FINANCIAL TRANSACTION

BACKGROUND

In a sales transaction, a vendor provides a good or service (i.e., a product) to a customer in exchange for a specified amount of currency. The currency may be real (e.g., recognized by one of the world governments) or virtual (e.g., used by a particular institution or game). For example, a customer may eat food at a restaurant. In exchange, the customer may pay twenty dollars for the food and the service. When the customer receives a bill stating the total, the customer selects a payment option to pay the total. A payment option specifies how the customer elects to pay for the good or the service. For example, the customer may pay with a specific credit card, debit card, check, or any other type of payment option. Customers may even have multiple payment options in each category. For example, with regards to credit cards, the customer may have a Visa® Credit Card, two different MasterCard® Credit Cards, an American Express® Credit Card, and other such credit cards. (Visa® is a registered trademark of Visa, Inc., located in San Francisco, Calif.; MasterCard® is a registered trademark of MasterCard Worldwide located in Purchase, N.Y.; American Express® is a registered trademark of American Express Company, located in New York, N.Y.).

When the customer selects the payment option, the customer may desire to consider the costs and benefits of using the payment option for the particular type of sales transaction. The costs and benefits are typically defined in a contract that the customer signs when creating an account with a financial institution that provides the payment option. For example, the contract may include a reward package for using the payment option, interest rates on credit based purchases, provisions relating to particular vendors or types of vendors, and other such provisions. The benefits may change over time, such as when the rewards program is revolving or when the financial institution changes the contract.

Because of the contract, the customer may desire to select the most preferred payment option to pay the bill. However, the customer typically does not remember all of the provisions of the contract before selecting the payment option. Thus, the payment option that the customer selects is the payment option that the customer only believes to be preferred (e.g., the payment option that seems to be optimal, provide the best rewards, provides most benefits, provides most value, etc.). The selected payment option may or may not be, in fact, optimal.

SUMMARY

In general, in one aspect, the invention relates to a method for performing a financial transaction that includes identifying a plurality of payment options associated with a payer executing the financial transaction, wherein each of the plurality of payment options is linked to a financial account of the payer, obtaining cost data and benefit data for each of the plurality of payment options, wherein the cost data includes a cost of using the payment option for the financial transaction and the benefit data includes a benefit of using the payment option for the financial transaction, selecting a preferred payment option from the plurality of payment options for the financial transaction based on the cost data and the benefit data, and processing the financial transaction using the preferred payment option to obtain a transaction confirmation.

In general, in one aspect, the invention relates to a system for performing a financial transaction that includes a data repository for storing cost data and benefit data, wherein the cost data and benefit data includes a cost of using each payment option for the financial transaction and a benefit of using each payment option for the financial transaction. The system also includes a payment application operatively connected to the data repository and configured to identifying a plurality of payment options associated with a payer executing the financial transaction, wherein each of the plurality of payment options is linked to a financial account of the payer, obtaining cost data and benefit data for each of the plurality of payment options, wherein the cost data includes a cost of using the payment option for the financial transaction and the benefit data includes a benefit of using the payment option for the financial transaction, selecting a preferred payment option from the plurality of payment options for the financial transaction based on the cost data and the benefit data, and processing the financial transaction using the preferred payment option to obtain a transaction confirmation.

In general, in one aspect, the invention relates to a computer readable medium that includes computer readable program code for causing a computing device to process a financial transaction between a payer and a payee by identifying a plurality of payment options associated with the payer executing the financial transaction, wherein each of the plurality of payment options is linked to a financial account of the payer, obtaining cost data and benefit data for each of the plurality of payment options, wherein the cost data includes a cost of using the payment option for the financial transaction and the benefit data includes a benefit of using the payment option for the financial transaction, selecting a preferred payment option from the plurality of payment options for the financial transaction based on the cost data and the benefit data, and processing the financial transaction using the preferred payment option to obtain a transaction confirmation.

In general, in one aspect, the invention relates to a user interface executing on a computing device, the user interface configured to receive a request to identify a preferred payment option from a payer executing the financial transaction, identify a plurality of payment options associated with the payer based on the request, wherein each of the plurality of payment options is linked to a financial account of the payer, obtain cost data and benefit data for each of the plurality of payment options, wherein the cost data includes a cost of using the payment option for the financial transaction and the benefit data includes a benefit of using the payment option for the financial transaction, select the preferred payment option from the plurality of payment options for the financial transaction based on the cost data and the benefit data, and display the preferred payment option.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for performing a financial transaction. Specifically, embodiments of the invention assist the payer in selecting the preferred payment option to pay a payee. In one or more embodiments of the invention, a payer or payee may initiate a financial transaction. Based on the initiation of the financial transaction, the possible payment options are identified. Cost data and benefit data are obtained for each of the possible payment options. Based on the cost data and benefit data, the preferred payment option is selected. The preferred payment option may optionally be also based on general data about the payer, such as purchasing patterns of the payer. Finally, the financial transaction is processed using the preferred payment option.

In one or more embodiments of the invention, a payment application obtains the cost data and benefit data and identifies the preferred payment option automatically. Specifically, in this embodiment, the consumer intervention is not required at the point of sale for identifying the preferred payment option.

Figure 1:
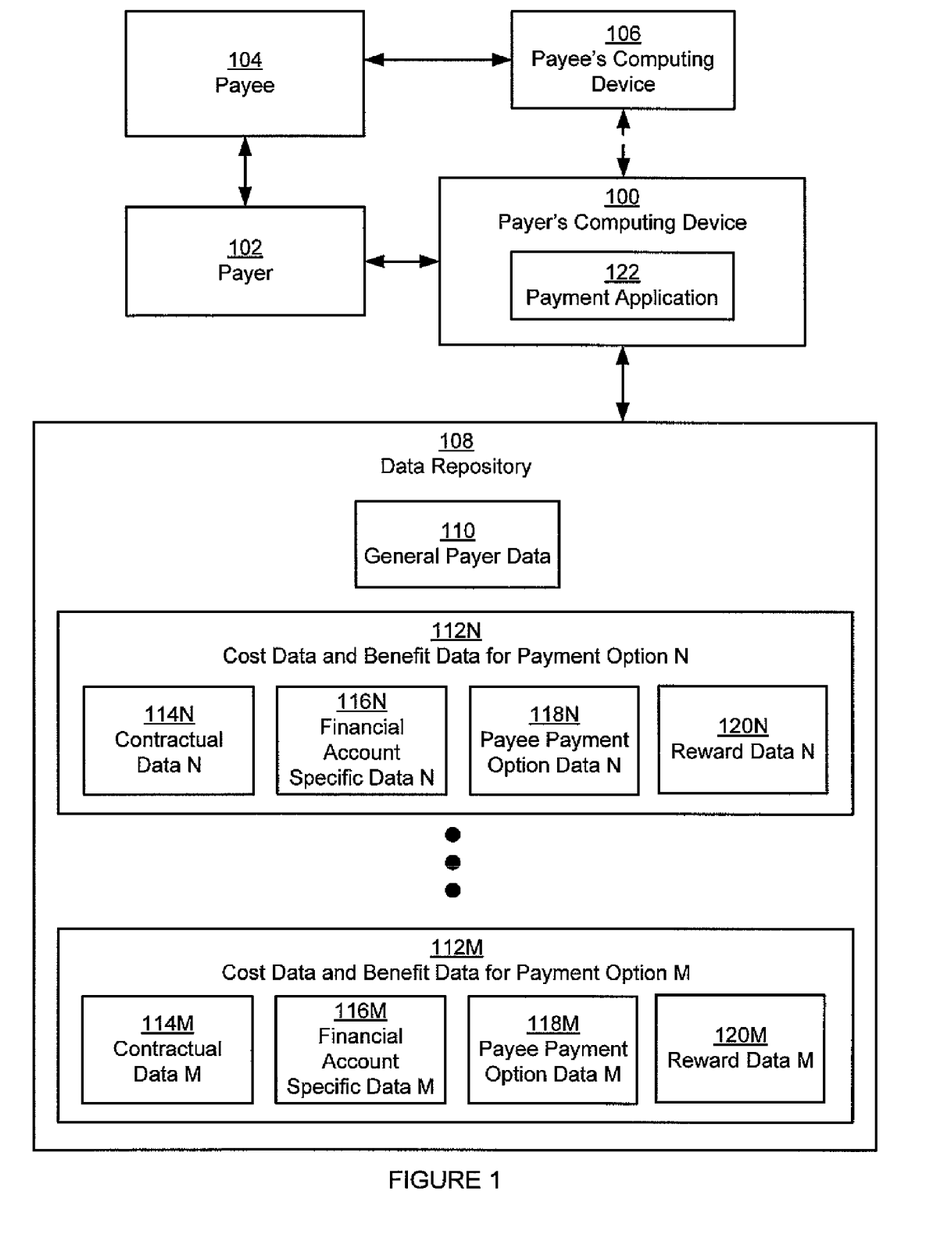
FIG. 1 shows a schematic diagram of a system in accordance with one or more embodiments of the invention.

FIG. 1 shows a schematic diagram of a system in accordance with one or more embodiments of the invention. As shown in FIG. 1, the system includes a payer's computing device (100) and a data repository (108) in accordance with one or more embodiments of the invention. The payer's computing device (100) and the data repository (108) are described below.

In one or more embodiments of the invention, a payer's computing device (100) is any type of device that may be used to interact with a payer (102) and execute a payment application (122) (discussed below). For example, the payer's computing device (100) may be a mobile device, a computer system, or any other such device capable of processing data. Example mobile devices include a mobile telephone, a laptop computer, a personal digital assistant, a smart phone, or any other such portable device capable of processing data. Examples of computer systems include a desktop computer, a workstation computer system, and other such systems capable of processing data.

In one or more embodiments of the invention, the payer's computing device (100) includes functionality to interact with one or more payer(s) (102). A payer (102) is an individual who performs a financial transaction. The payer (102) may perform financial transactions for themselves, family, or any other entity. The financial transactions may be to purchase one or more products, pay a debt, or perform other such transactions. The product may be one or more goods (e.g., groceries, furniture, plane tickets, hotel reservations) or services (e.g., roofing services, medical services, restaurant services, electricity, or any other service).

The payer (102) is associated with various payment options to perform the financial transaction. A payment option is a method by which the payer (102) may pay for the good or the service. Example types of payment options include credit card, debit card, eCheck, electronic funds transfer, Pay Pal™ account (Pay Pal™ is a trademark of Pay Pal, Inc., located in San Jose, Calif.), gift card, check, and other such methods of payments. The payer (102) may have multiple payment options of the same type. For example, the payer (102) may have multiple credit cards, multiple debit cards, in which the multiple payment options of the same type are associated with different financial institutions. Each payment option may be associated with a contract that identifies the terms and conditions for using the payment option and a rewards program.

Each payment option may be associated with a financial account (not shown). For example, the financial account may be a checking account, a savings account, credit account, a gift card account, and other such accounts. The financial account may include a balance, a payment due date, and a statement period.

In one or more embodiments of the invention, the payer performs the financial transaction with a payee (104). The payee (104) is the provider of the good or the service. For example, the payee (104) may be a restaurant, a doctor, a grocery store, a roofing company, an electric company, a mortgage company, a person who loaned money to the payer, or other similar entity.

In one or more embodiments of the invention, the payee (104) uses a payee's computing device (106) to process the financial transaction. The payee's computing device (106) is a computing device that includes functionality to process a payment in accordance with one or more embodiments of the invention, Processing the payment may include interacting with the payee's financial institution to debit the consumer's financial account and credit the payee's financial account. For example, the payee's computing device (106) may be a point of sale device, a server, or any other such computing device.

In one or more embodiments of the invention, the payer's computing device (100) and the payee's computing device (106) are configured to communicate. For example, the payer's computing device (100) and the payee's computing device (106) may be both configured to use near field technology, the Internet, or other similar communication technology.

Continuing with FIG. 1, the data repository (108) is any type of storage unit and/or device (e.g., a file system, database, collection of tables, or any other storage mechanism) for storing data for later access in accordance with one or more embodiments of the invention. Further, the data repository (108) may include multiple different storage units and/or devices. The multiple different storage units and/or devices may or may not be of the same type or located at the same physical site. For example, a portion of the data repository (108) may be on an identity server while another portion is distributed across the Internet. In one or more embodiments of the invention, the data repository (108), or a portion thereof is secure.

In one or more embodiments of the invention, the data in the data repository includes general payer data (110) and cost data and/or benefit data for each of the payment options (e.g., cost data and benefit data for payment option N (112N), cost data and benefit data for payment option M (112M)). Each of the different types of data is described below.

The general payer data (110) includes data that is applicable to all payment options. The general payer data may include payer's purchasing patterns data, payer forecasted data, data about the payer's goals, a special payee list, and other such general data.

The payer's purchasing patterns data is data that identifies or may be used to identify the payer's purchasing patterns in accordance with one or more embodiments of the invention. For example, the payer's purchasing patterns data may include information about each financial transaction performed by the payer. In another example, the payer's purchasing patterns may include aggregated data about the payer's purchasing patterns. The aggregated data may include such data as the type of financial transaction, the average amount of the financial transaction, the percentage in which each of the different payment options are selected, and/or other such data.

The payer forecasted data may include information about the payer's expected income or expenses. For example, the payer forecasted data may include data identifying reoccurring expenses, such as when payment to the internal revenue service, when a mortgage payment, when the payer receives a paycheck, and other such data.

In one or more embodiments of the invention, the payer goals may include information about financially related goals of the payer. For example, the payer goals may include information that the payer wants to settle debts, fly to Cozumel, Mexico, a vacation to Hawaii, or purchase a plasma television using only reward points. The payer goal may also include a savings goal and a budget goal.

In one or more embodiments of the invention, the special payee list identifies payees that the payer attaches different criteria for selecting the payment option. For example, the special payee list may identify payees that the payer wants to assist. The payer may assist the payee by using a payment option that charges a low transaction fee. The transaction fee is a charge that the payee pays to a financial institution for accepting a particular type of payment. For example, certain credit card companies charge the payee a transaction fee of one-five percent of the payer's payment. In the example, since the payer wants to assist the payee, the payer may add a parameter for payees that the consumer wants to assist that indicate the payment option to use is the one that charges a low transaction fee, if any.

In another example, the special payee list may identify payees with which the payer has an agreement to use a particular payment option. For example, the payee may give the payer a discount if the payer pays cash or check rather than a credit card.

The cost data and benefit data for each of the payment options (e.g., cost data and benefit data for payment option N (112N), cost data and benefit data for payment option M (12M)) includes contractual data (e.g., contractual data N (114N), contractual data M (114M)), financial account specific data (e.g., financial account specific data N (116N), financial account specific data M (116M)), payee payment option data (e.g., payee payment option data N (118N), payee payment option data M (118M)), and reward data (e.g., reward data N (120N), reward data M (120M)). Each of the different types of data is discussed below.

The contractual data (e.g., contractual data N (114N), contractual data M (114M)) identifies the agreement between the payer and the financial institution providing the payment option. For example, the contractual data may identify an annual percentage rate, a fixed term in which the interest rate is charged, an inactivity fee for not using the payment option, a minimum balance requirement, a maximum limit that can be credited, exclusions of using the payment option, a length of time for a grace period, finance charges, whether fraud protection is provided, overdraft/over limit fees, and other such provisions of the agreement.

The financial account specific data (e.g., financial account specific data N (116N), financial account specific data M (16M)) identifies data specific to the payer's financial account. For example, the financial account specific data (e.g., financial account specific data N (116N), financial account specific data M (116M)) may include the current balance in the financial account, the balance closing date, the payment due date, reoccurring expenses to the financial account, reoccurring income to the financial account, an account number, an expiration date, a security code, the physical address associated with the account, and other such data specific to the payer's financial account.

The payee payment option data (e.g., payee payment option data N (118N), payee payment option data M (118M)) is data specific to the payee in relation to the payment option. For example, payee payment option data may identify whether the payee accepts the payment option, an extra fee charged by the payee for using the payment option, and other data specific to the payee.

The payee payment option data may also identify information instigated by a financial institution providing the payment option. Specifically, the financial institution may have certain costs and benefits regarding using the payment option at a specific payee or category of payee. For example, the information may identify a fee charged by the financial institution, whether insurance is offered, whether the payment option may be used, an extra discount, and other such information.

The reward data (e.g., reward data N (120N), reward data M (120M)) identifies rewards for using the payment option. For example, the reward data may identify points earned for using the payment option, cash back rewards, whether the reward is revolving and needs to be updated on a regular basis, specific discounts offered, and other such rewards.

Although FIG. 1 shows a categorization of cost data and benefit data, those skilled in the art will appreciate that the cost data and benefit may or may not be stored in the data repository according to the categories. For example, the storage structure of the data repository (108) may not distinguish between contractual data and payee payment option data or between contractual data and reward data. Data may be stored in the data repository (108) using any possible storage structure. For example, the data repository (108) may be a relational database. In the example payees may be stored in one table, cost data and benefit data applicable to multiple payers may be stored in another table, cost data and benefit data specific to the financial account of each payer may be stored in another table. In the example, the tables may include cross references to each other.

Although FIG. 1 shows the data repository (108) as a separate component from the payer's computing device (100), the payer's computing device (100) may include the data repository (108). Specifically, the data repository (108) may be storage in which at least a portion is local to the computing device.

Returning to the computing device on FIG. 1, the computing device includes a payment application (122). The payment application (122) includes functionality to receive a request for a preferred payment option and identify the preferred payment option based on the request. Specifically, the payment application (122) includes functionality to analyze cost data and benefit data in the data repository for using each payment option (e.g., cost data and benefit data for payment option N (112N), cost data and benefit data for payment option M (112M)) and determine the preferred payment option from the cost data and benefit data.

In one or more embodiments of the invention, the payment application (122) includes a user interface (not shown). In one or more embodiments of the invention, the user interface is specific to the computing device. Specifically, the payment application (122) may include one user interface that accounts for limited screen size of a mobile device and another user interface with increased functionality for a personal computer. In one or more embodiments of the invention, the user interface includes an initialization and options interface and a payment interface.

The initialization and options interface allows the payer to submit cost data, benefit data, and general payer data. The initialization and options interface further allows the payer to populate the data repository for cost data and benefit data. For example, the initialization and option interface may include interface components to allow the payer to submit account numbers, financial institutions, and other such information about the payment options. The initialization and options interface may also allow the payer to submit preferences for selecting the preferred payment option.

The payment interface is an interface that the payer may use to request the computing device to process the financial transaction. For example, the payment interface may include functionality to detect the presence of the computing device next to a near-fields communication device. Alternatively, the payment interface may include user interface components (e.g., buttons, dropdown boxes, checkboxes, and other such components) for the payer (102) to submit a vender and the total of the financial transaction. The payment interface may include functionality to display a preferred payment option and an interface component, such as a button, whereby the payer (102) may accept the payment with the preferred payment option.

In one or more embodiments of the invention, the payment application (122) is configured to learn the payer's preferences. For example, if a payer rejects a payment option more than a threshold number of times, then the payment application may add the payment option to a low ranking list.

Although FIG. 1 shows the payment application (122) as executing locally on the computing device, the payment application (122) may execute on a remote computing device, such as a server. For example, the payment application (122) may be a web application. In another example, the payment application may be a plug-in to a web browser. Alternatively, the payment application (122) may be a distributed application. In such example, a client portion of the payment application may execute on the payer's computer system (100) and a server portion of the payment application may execute on a remote computer system.

In one or more embodiments of the invention, the payment application (122) executes on multiple payer computing devices. For example, the payment application (122) may execute on a mobile device and on a personal computer. In the example, the payer (102) is able to access the payment application regardless of whether the payer (102) is at a payee's physical location or purchasing from the payee via the Internet. In one or more embodiments of the invention, the payment application on the different computing device may include functionality to synchronize data with each other. For example, if the payer (102) changes the cost data and benefit data using the payment application on the personal computer and the cost data and benefit data is stored locally, then the change may be automatically propagated to the payment application on payer's mobile computing device.

FIGS. 2-6 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. In addition, steps such as receive acknowledgements have been omitted to simplify the presentation.

In one or more embodiments of the invention, prior to identifying a preferred payment option, the data repository is initialized with cost data and benefit data. Different techniques may be used for initializing the data repository with the cost data and benefit data. Below are only a few examples of the different techniques that may be used.

One example for initializing the data repository with cost data and benefit data may include the payer providing the cost data and benefit data. For example, the payer may submit the cost data and benefit data in a fillable form. Cost data and benefit data submitted by the payer may be used to populate the data repository.

In another example, the payer may provide financial account information for each of the payer's financial accounts that have an associated payment option. The financial account information may be used to identify the cost data and benefit data. For example, a centralized repository used by multiple payers may have cost data and benefit data for known payment options. The cost data and benefit data for the known payment options may be used to populate the cost data and benefit data for the payer's payment options.

Figure 2:
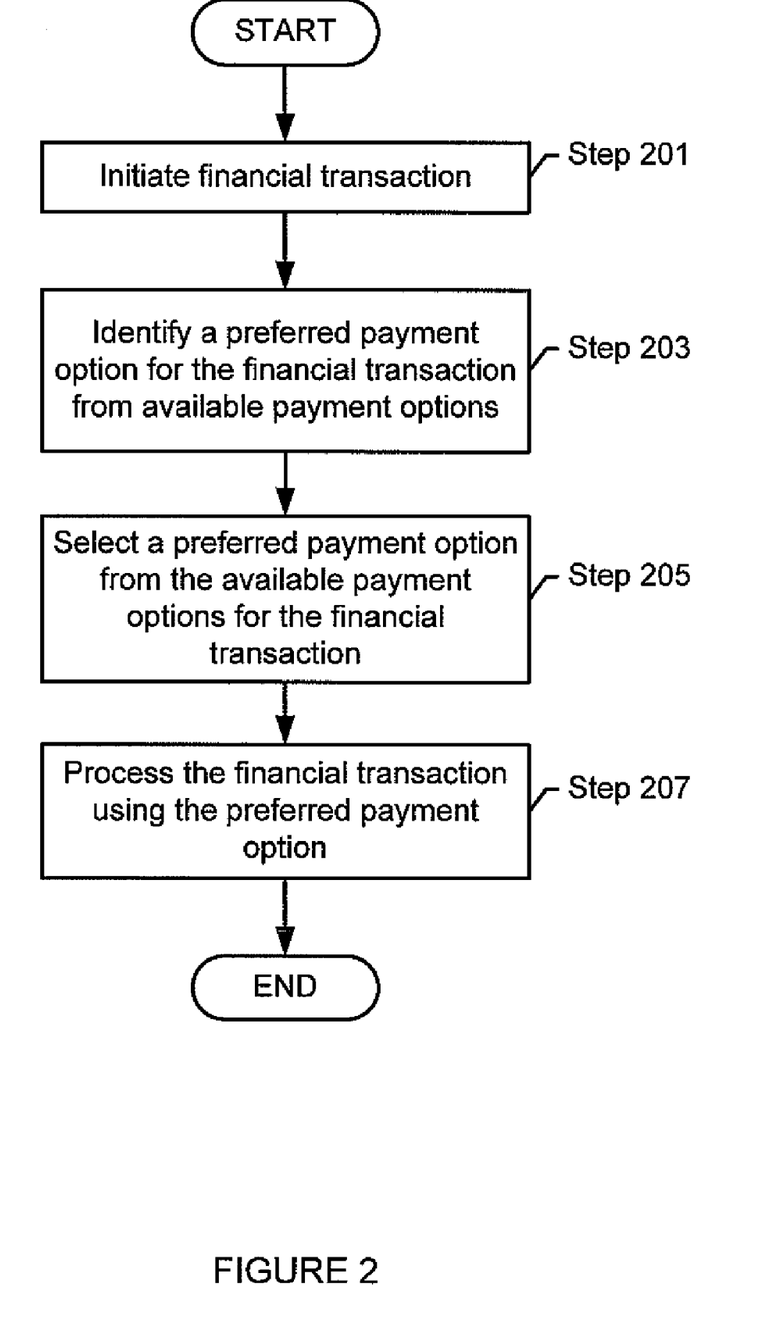
FIGS. 2-6 show flowcharts in accordance with one or more embodiments of the invention.

FIG. 2 shows a flowchart for a payer to select the preferred payment option with the assistance of the computing device. Initially, the payer initiates a financial transaction (Step 201). The payer may initiate the financial transaction at the geographic location of the payee, using the Internet, speaking to the payee or a representative of the payee over the phone, or performing any other similar action.

When the payer is ready to pay, a preferred payment option is identified for the financial transaction (Step 203). For example, consider the scenario in which the payer's computing device and the payee's computing device are equipped with near-fields technology or other similar technology. In such a scenario, the payer may submit the purchase request by tapping, waving, etc. the mobile device over the payee's computing device. In another example, the payer may manually submit the payee's name and total into the computing device. In another example, if the payer is accessing the payee's website via an Internet browser, then the payer may select a button that initiates the financial transaction and obtains the payee's name and total from the payee's website. The above are merely examples of methods that may be used for the payer to identify the preferred payment option. Various other methods may also be used.

In one or more embodiments of the invention, the information is processed and the preferred payment option is identified. Thus, the payer may receive a selected preferred payment option on the computing device (Step 205). For example, a message may be displayed that says, "Pay [the total] using the [preferred payment option]?" In another example, the total amount due and the preferred payment option are displayed for approval by the payer. In the second example, once identified, information about the preferred payment option may be automatically sent to the payee's computing device. For example, a payment application may send an account number, an expiration date, and/or a security code to the payee's computing device.

When the payer views the preferred payment option, the payer may approve the financial transaction and process the financial transaction using the preferred payment option (Step 207). Approving the preferred payment option may be performed by selecting an accept button, signing a receipt, entering a pin number, or performing other action that indicates approval. In one or more embodiments of the invention, if the payer does not approve of the preferred payment option, then the payer may request a new preferred payment option or specify the payment option to use.

In one or more embodiments of the invention, the financial transaction is processed using the preferred payment option. Processing the financial transaction may include the payer and/or the payment application providing the payee with information about the preferred payment option (e.g., account number, expiration date, and other such information). The payee may then process the information to debit financial account associated with the preferred payment option and credit the payee's account in accordance with one or more embodiments of the invention. Alternatively, if the preferred payment option is cash, then the payer supplies the cash to the payee to complete the financial transaction.

Those skilled in the art will appreciate that Steps 205 and 207 may be optional. Specifically, the payer may simply identify the preferred payment option. In response, the financial transaction is completed without further input from the user. For example, after identifying the preferred payment option, the information about the preferred payment option is provided to the payee. In response, the payee may process the financial transaction using the supplied information about the preferred payment option.

In one or more embodiments of the invention, a transaction confirmation is obtained by the processing of the financial transaction. The transaction confirmation may be a receipt, an email indicating that the transaction has been processed, an electronic, verbal, or paper notice indicating that the payment option is debited by the total amount, or any other such type of confirmation.

As shown in the flowchart above, because the payer only needs to provide the payee's name and total for the financial transaction, the payer is not required to remember cost data and benefit data that makes the payment option preferable. For example, the payer may not remember the rewards program associated with each payment option, the terms and conditions associated with the payment option, the current balance of the payment option, or other such information. Rather, all necessary information is obtained and processed by a payment application to identify the preferred payment option in accordance with one or more embodiments of the invention.

Figure 3:
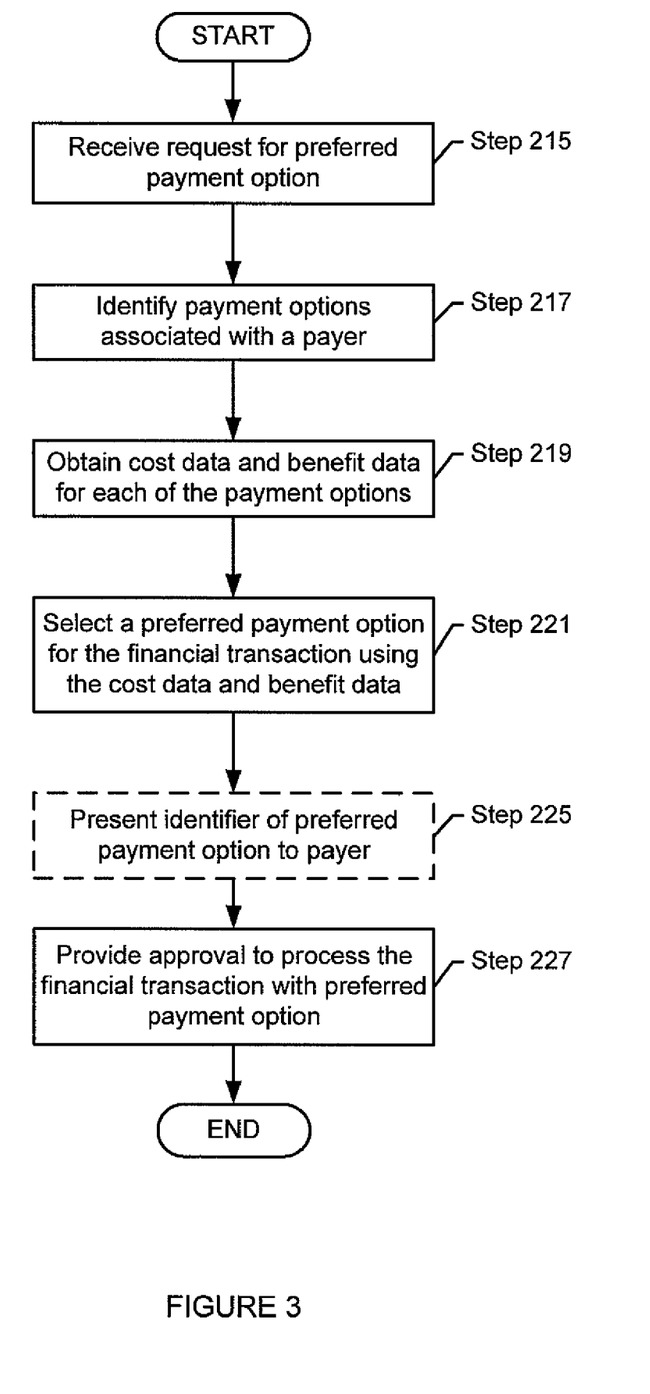

FIG. 3 shows a flowchart of a method to process a financial transaction in accordance with one or more embodiments of the invention. Initially, a request is received for a preferred payment option (Step 215). As discussed above, the payer may send the request in a variety of manners. In one or more embodiments of the invention, a payment application receives and processes the request in a corresponding manner.

In one or more embodiments of the invention, payment options associated with the payer are identified (Step 217). In Step 219, cost data and benefit data is obtained for each of the payment options. In one or more embodiments of the invention, steps 217 and 219 may be performed by sending a query to the data repository. The data repository may respond with cost data and benefit data for each of the payment options.

In one or more embodiments of the invention, the preferred payment option is selected for the financial transaction using the cost data and benefit data (Step 221). Multiple different methods may be used to select the preferred payment option. Different examples of selecting the preferred payment option are discussed below and in FIGS. 4-6.

Continuing with FIG. 3, after selecting the preferred payment option, the preferred payment option is presented to the payer (Step 225). At this stage, the payer may choose whether to approve or deny of the preferred payment option.

In one or more embodiments of the invention, the financial transaction is processed using the preferred payment option (Step 227). Specifically, a payee may be provided with the information to process the payment option.

Although not shown in FIG. 3, in one or more embodiments of the invention, multiple payment options may be identified as relatively equally preferred. For example, multiple payment options may be within a threshold score of each other or may be in the final contender group (discussed below). In such a scenario, the payment option in the group of the multiple payment option with the greatest benefit may be presented to the user as the selected payment option. Alternatively (or additionally), data about other payers' preferences may be presented when confronting the same situation. For example, the data about other payers' preferences may identify the payment option that other payers' use for a particular type of financial transaction and payee.

Figure 4:
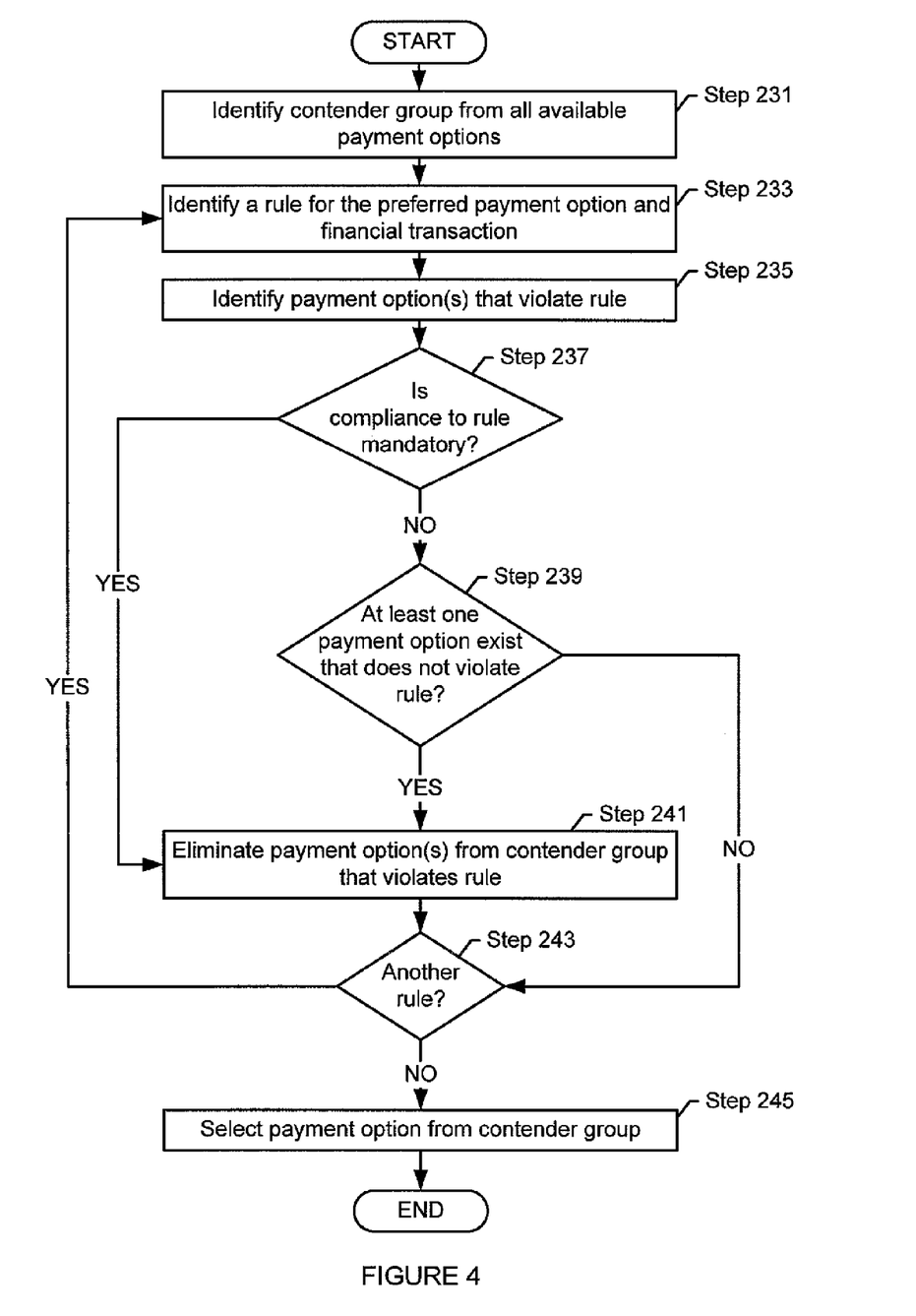

FIG. 4 shows an example of how the preferred payment option may be selected in accordance with one or more embodiments of the invention. Specifically, FIG. 4 shows a rule based approach for selecting the preferred payment option. Using a rule-based approach, the data repository may contain multiple rules. A rule is a statement that defines a component of an idealized preferred payment option. For example, a rule may require that the preferred payment option is accepted by payee. In another example, the rule may require the preferred payment option to have a transaction fee that is less than a certain threshold. In another example, the rule may be based on the payer's goal. An example of a rule based on a payer's goal is requiring that the preferred payment option has a rewards program with frequent flyer mile rewards. In another example, the rule may be based on the type of financial transaction, such as a payment option that provides some form of insurance. The rules may be defined by the user and/or a payment application. For example, while the payer is initializing the payment application, the payer may provide information (e.g., in the general payer data) resulting in the generation of the rule.

In one or more embodiments of the invention, rules are ranked. The ranking may be based on the degree in which compliance is required. For example, rules that require mandatory compliance may be ranked higher than rules in which compliance is strongly desired. Similarly, in the example, rules in which compliance is strongly desired may be higher than rules in which compliance is purely optional. The ranking of rules may be performed by the payer or by the payment application.

As shown in FIG. 4, a contender group is identified from all available payment options (Step 231). The contender group initially may include all of the payment options usable by the payer or some subset thereof.

Next, a rule is identified for the financial transaction and/or the preferred payment option(s) (Step 233). The rules that are identified may be a rule applicable to all financial transactions/preferred payment options or only to the particular type of financial transaction/preferred payment option (e.g., based on the payee, category of payee, method in which the financial transaction is performed, and other such types). In one or more embodiments of the invention, rules are identified in the order in which the rules are ranked. Thus, payment options remaining in the contender group after a rule is applied are more preferable over the payment options eliminated by the application of the rule.

Payment options that violate the rule are identified using the cost data and benefit data of the payment option (Step 235). For example, if the rule requires that the payee accept the payment option, then payment options not accepted by the payee are identified. In another example, if the rule requires that the payment option provide frequent flyer miles, then payment options that do not provide frequent flyer miles are identified.

Next, a determination is made whether compliance to the rule is mandatory (Step 237). Compliance to the rule may be deemed necessary when the payer cannot pay with the payment option. For example, compliance to rules that requires that the payee accept the payment option, the payment option is usable at the type of payee, the balance of the financial account associated with the payment option with the total does not place the payer over the limit, and other such similar rules are mandatory. If the rule is mandatory, then payment option(s) that violate the rule are eliminated from the contender group (Step 241).

If the rule is not mandatory, then a determination is made whether at least one payment option exist in the contender group that does not violate the rule (Step 239). If a payment option exists in the contender group that does not violate the rule, then payment options that violate the rule are eliminated from the contender group (Step 241). Alternatively, if all payment options remaining in the contender group violate the rule, then the rule is ignored and no payment options are eliminated in accordance with one or more embodiments of the invention.

Continuing with FIG. 4, a determination is made whether another rule is identified for the financial transaction (Step 243). If another rule is identified, then the method may repeat with Step 233 for the next rule. In one or more embodiments of the invention, the next rule identified is in the order of the ranking of the rule.

Figure 5:
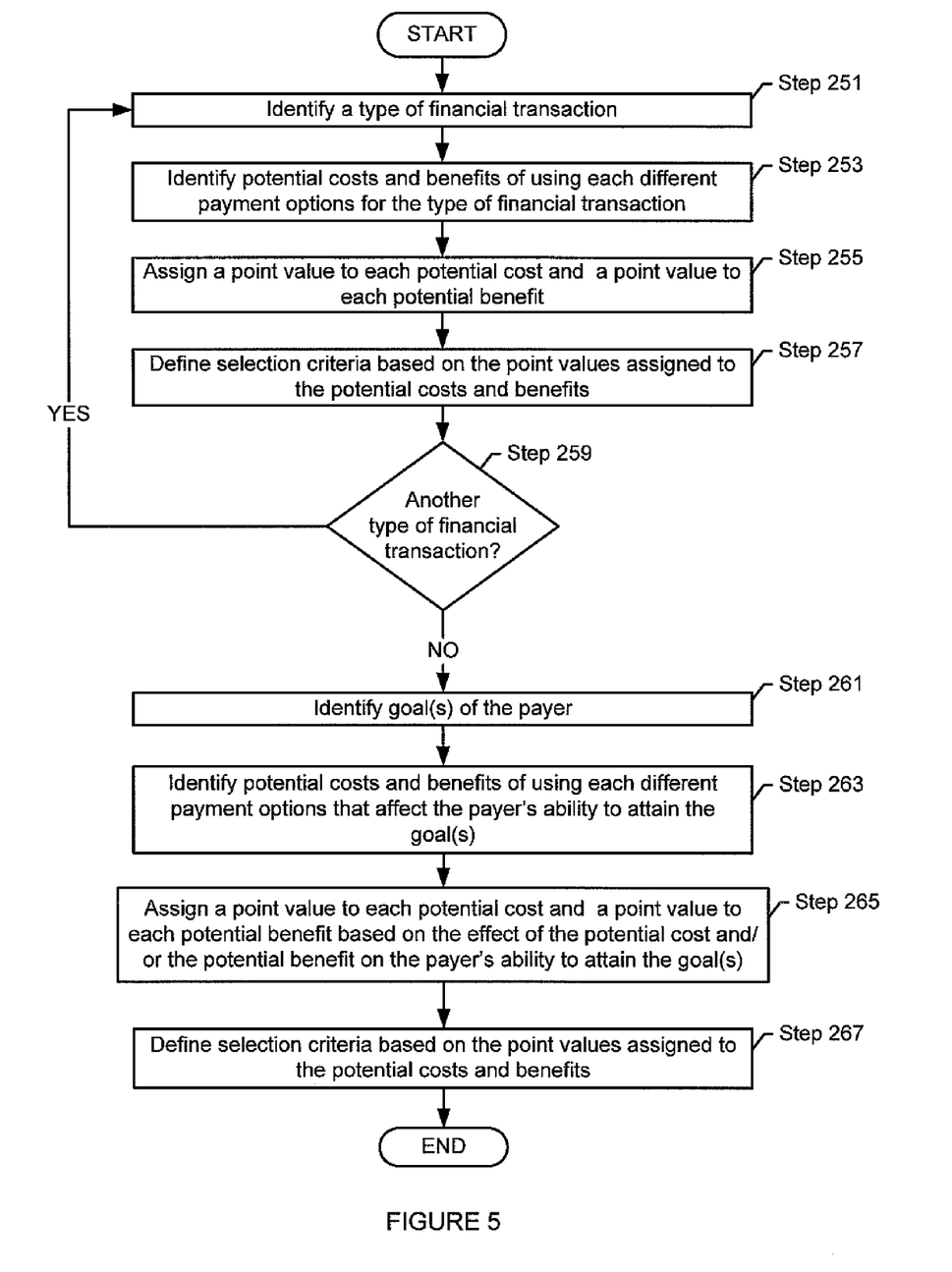
Figure 6:
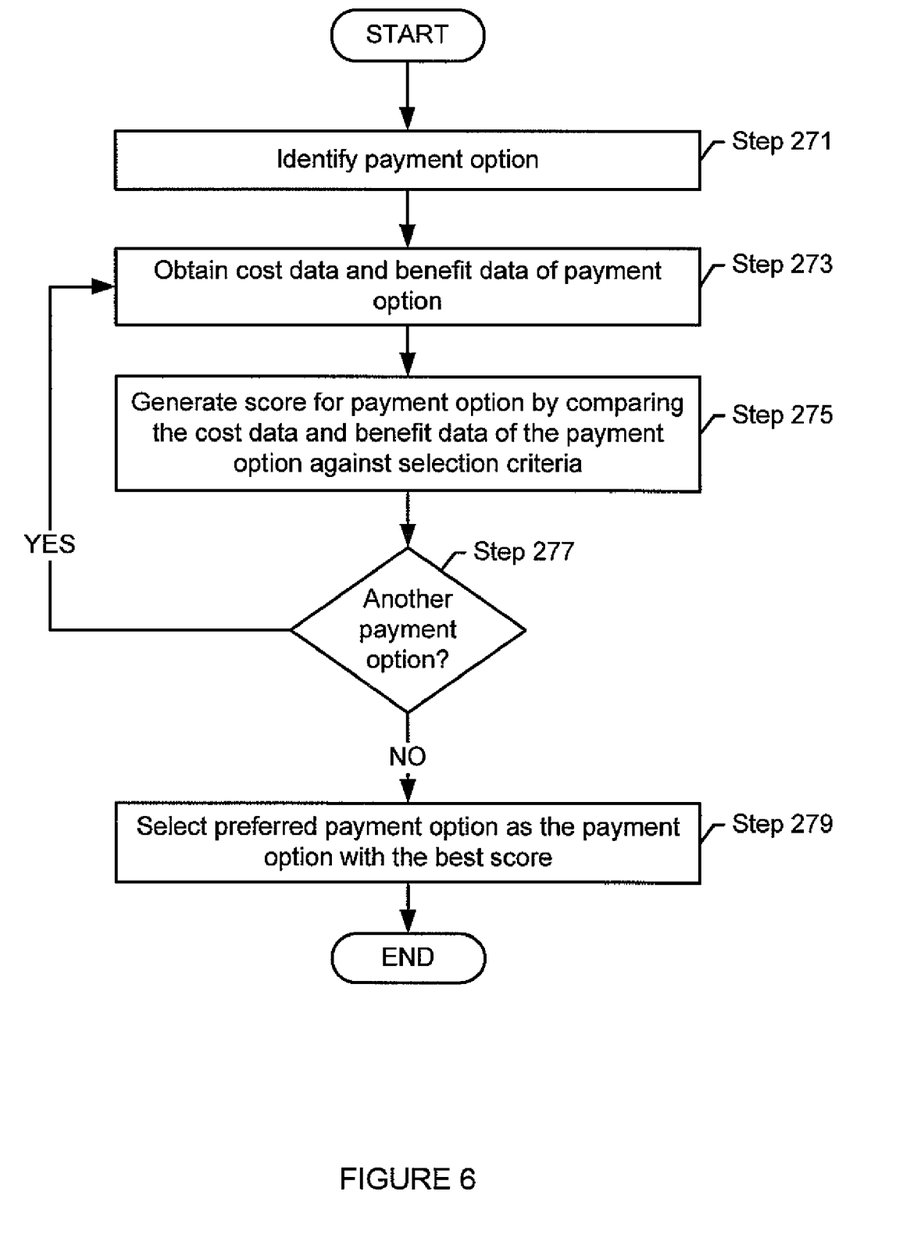

Alternatively, if no more rules are identified, then the preferred payment option is selected from the contender group (Step 245). In one or more embodiments of the invention, the preferred payment option is the payment option that maximizes the payer's goals. For example, if the payer's goal is to settle a debt, then the preferred payment option may be the payment option that provides the greatest cash back rewards and has the least amount of fees. Alternatively, a score may be assigned to the remaining payment options in the contender group, such as by using the method discussed in FIGS. 5 and 6. FIGS. 5 and 6 show flowcharts for a score based approach to selecting the preferred payment option in accordance with one or more embodiments of the invention. In the score based approach, selection criteria are used. Selection criteria assign point values to potential costs and benefits. Costs may be assigned negative points while benefits are assigned positive points. The preferred payment option has the highest score. Alternatively, if costs are assigned positive points and benefits are assigned negative points, then the preferred payment option is the payment option with the lowest score.

FIG. 5 shows a flowchart for defining selection criteria in accordance with one or more embodiments of the invention. In Step 251, a type of financial transaction is identified. As previously discussed, financial transactions may have multiple different types. For example, the types of sales may include payee, a category of vender, whether the transaction is occurring via the Internet, in person, or using the phone, the amount of the total, and other such types. Thus, a single financial transaction may be of multiple different types.

Next, the potential costs and the potential benefits are identified for using each of the different payment options for the type of financial transaction (Step 253). Identifying the potential costs and the potential benefits for the financial transaction may be performed by obtaining all cost data and benefit data for the payment options that may be used for the particular type of financial transaction.

A point value is assigned to each potential cost and each potential benefit (Step 255). The point value may be based on the amount of cost/benefit. For example, if the type of financial transaction is car rental, then the benefit of collision insurance may be assigned a large point value. Benefits, such as cash back, rewards points, and frequent flyer miles may be assigned points based on the monetary value of the benefit in accordance with one or more embodiments of the invention. For example, to identify the monetary value of a rewards program, the average market value of the items that may be purchased with rewards points in conjunction with the average number of rewards points may be used. The above are only a few examples of how points may be assigned to costs and benefits.

Based on the potential costs and the potential benefits, selection criteria are defined (Step 257). As discussed above, a selection criterion is a definition of a cost with a point value or a benefit with the point value. The selection criteria may be grouped according to the type of financial transaction.

Continuing with FIG. 5, a determination is made whether another type of financial transaction exists (Step 259). If another type of financial transaction exists, then the method may continue with Step 251.

In Step 261, the goals of the payer are identified in accordance with one or more embodiments of the invention. Further, the potential costs and the potential benefits of using each of the different payment options that affect the payer's ability to attain the goal(s) (Step 263). Identifying the potential costs and potential benefits may be performed by identifying all costs and benefits of the payment options. For each of the costs and each of the benefits, a determination is made whether the cost or benefit affects the payer's ability to attain the goal. For example, if the cost is a high interest rate and the payer's goal is to pay off debts, then the cost negatively affects the payer's ability to attain the goal.

Point values are assigned to each potential cost and each potential benefit based on the effect of the potential cost and the potential benefit on the payer's ability to attain the goal (Step 265). Assigning the point value may be performed, as discussed above in Step 255.

In Step 267, selection criteria for the payer's goal are defined based on the assigned point value. The selection criteria for the payer's goal may be general selection criteria that are used for all financial transactions.

FIG. 6 shows a flowchart of a method for selecting a preferred payment option using the selection criteria in accordance with one or more embodiments of the invention. Initially, a payment option is identified (Step 271). The payment option that is identified is any payment option that may be used for the particular financial transaction. For example, the identified payment options may only include payment options that are accepted by the payee, have a balance that with the total of the financial transaction does not exceed a limit, the contractual agreement allows the payment option to be used by to purchase goods or services from the payee, and other similar mandatory requirements.

Further, cost data and benefit data for using the payment option is obtained (Step 273). In one or more embodiments of the invention, a score is generated for the payment option by comparing the cost data and benefit data with the selection criteria (Step 275). Generating the score may be performed by obtaining all selection criteria defined for the type(s) of the financial transaction and all selection criteria defined for the payer's goal. Each cost and each benefit of using the payment option is assigned points based on the selection criteria in accordance with one or more embodiments of the invention. The total of the points is the score that is generated for the payment option.

A determination is made as to whether another payment option exists that may be used (Step 277). If another payment option exists, then method may repeat with Step 273 to generate a score for the next payment option.

Alternatively, if another payment option does not exist, then the preferred payment option is selected as the one with the best (e.g., highest, lowest) score (Step 279). Specifically, the preferred payment option is the one that has the highest or lowest score depending on how the points are assigned.

For the following example, consider the scenario in which a payer, Jeffrey Dodds, possesses credit card A, credit card M, bank account A from which an e-Check may be created, bank account B with a debit card, credit card D, and a pre-loaded gift card.

In the example, each of the payment options is controlled by a terms and conditions contract specifying the costs associated with the payment option. The payment options also include various benefits of using the payment option. The following is a summary of each of the payment options' costs and benefits.

The credit card A offers online purchase protection against fraud, one point for every dollar that can be used to obtain cash back, travel services, entertainment services, and various goods. Further, for specific payees, credit card A offers double points. However, credit card A also has a 2.99% late payment charge on any delinquent balance.

The preloaded gift card may be used to purchase most items except for plane tickets or a room at a hotel. The gift card also has a two dollar monthly service charge after the first twelve months. About fifty different merchants offer a discount for using the preloaded gift card. With the exception of the discount the preloaded gift card does not offer additional rewards.

Credit card M includes Worldwide Automatic Travel Accident Insurance, Trip Interruption Insurance, Car Rental Insurance with a Collision Damage Waiver, one percent cash back on retail purchases, and a low currency exchange rate. Credit card M charges an 8.99% annual percentage rate.

Credit card D includes a reward offering a five percent cash back bonus on certain categories of purchases, excess collision damage waiver insurance, air travel insurance, a low exchange rate, a 25 day grace period, and a revolving awards program. Further, credit card D charges a 10.99% annual percentage rate on all carried balances, a minimum finance charge of fifty cents, and a fee for being over the credit limit of $2,000.

Bank account A (from which the e-Check may be created) is required to maintain a minimum balance of one hundred dollars in order to avoid service charges and/or other fees associated with the bank account. Bank account B (from which the debit card is associated) applies an overdraft fee of a thirty-five dollar when a requested withdrawal exceeds the balance of funds maintained in the bank account (i.e. an overdraft of the bank account balance).

Continuing with the example, Jeffrey owns smart phone that is generally within his vicinity at all times and a personal computer. Both the smart phone and the personal computer are capable of executing a payment application using a user interface of the computing device. Initially, Jeffrey submits his financial account information for each of the payment options into the payment application. Jeffrey may also submit to the payment application information about his goal of traveling to Portugal in six months. Subsequently, the payment application accessed his financial accounts and a centralized database to obtain the cost data and benefit data for each of the payment options. The payment application may continue to update the cost data and benefit data on a daily or weekly basis.

Continuing with the example, during the course of the six months, Jeffrey may purchase a variety of items. For example, he may purchase groceries at the grocery store. When the cashier presents Jeffrey with the total, Jeffrey taps his smart phone over a near-fields communication device attached to the cashier stand. Thus, the smart phone communicates with the point of sale system at the grocery store to obtain the total for the purchase and an identification of the grocery store.

Next, in the example, the possible payment options that the particular payee accepts are identified. After identifying that the only payment option not accepted is credit card D, cost data and benefit data is obtained for the remaining cards. The cost data and benefit data obtained includes all of the cost data and benefit data above as well as information that Jeffrey does not have enough money in the bank account to pay with a debit card and keep the minimum balance for free checking. Also, information is obtained indicating that the preloaded gift card has seven months remaining before the two dollar service charge is debited. The balances for each of the credit cards are also obtained.

Continuing with the example, with the cost data and benefit data, the payment application assigns points to each of the payment options. Because Jeffrey is planning on a trip to Portugal, a larger amount of points are assigned to payment options that provide greater travel rewards, such as frequent flyer miles. Thus, a determination is made that credit card A is the payment option to use to make the purchase. The payment application displays a message stating, "Accept paying the total with credit card A?" Jeffrey selects a button to accept the payment.

In the example, once the acceptance is received, the transaction is processed at the cashier stand. To Jeffrey, the identification of the preferred payment option seems immediate. Jeffrey is not required to remember (or ever know) that credit card A offers the greatest frequent flyer miles, the payment options accepted by the payee, the current status of his financial accounts in terms of the balances, or any other cost data and benefit data.

Continuing with the example, Jeffrey begins making travel arrangements for his trip to Portugal. He uses his frequent flyer miles earned by the purchases to buy airfare tickets. Next, Jeffrey accesses the Internet to find a rental car. When he is ready to pay, he accesses a payment application on his personal computer.

Next, the possible payment options are identified, in this case by a payment application executing on Jeffrey's personal computer, for the rental car company. The possible payment options accepted by the rental car company include credit card A, the preloaded gift card, credit card D, and credit card M. Next, the cost data and benefit data associated with the payer and associated accounts, cards, etc. is obtained. From the cost data and benefit data, a determination is made that credit card D and the credit card M offer car rental insurance. A further determination is made that the credit card D will exceed the limit with the additional purchase of the rental car.

Using the cost data and benefit data, the payment application selects the credit card M for purchasing the rental car. Jeffrey accepts the payment option and credit card M is used to process the transaction. Because of the invention, Jeffrey, who rarely travels, does not need to remember that the credit card A does not offer rental car collision insurance or the current balance of the credit card D. Had Jeffrey selected the credit card A, Jeffrey would have also had to request expensive insurance from the rental car company. Had Jeffrey selected the credit card D, Jeffrey would have been charged a fee for being over the limit. Thus, in the example, Jeffrey was prevented from choosing the less preferable cards and saved money.

Continuing with the example, Jeffrey is on his trip in Portugal. He travels from one city to the next making hotel reservations only the night before staying at the hotel. When making a hotel reservation, Jeffrey calls the desired hotel, requests the room, and indicates the number of nights. When provided with the total for the reservation, Jeffrey enters the information into the user interface on his smart phone.

In the example, the possible payment options accepted by the hotel are identified. A further determination is made that the preloaded gift card cannot be used to make the hotel reservation according to the provisions of the gift card. Thus, the payment options include credit card A, credit card M, and credit card D.

Next, in the example, the cost data and benefit data is gathered for each of the payment options. Although the rewards offered by the credit card A are better, credit card A has an unfavorable exchange rate causing Jeffrey to be charged much more than required. Thus, credit card M and the credit card D are compared. Both credit cards offer the same low exchange rate. Upon comparing rewards programs, the current reward in the revolving rewards program of the credit card D offers a greater amount cash back than the credit card M. Thus, the credit card D is selected and the information is displayed on the smart phone.

Jeffrey completes the reservation over the phone using the preferred payment option, credit card D. Because of the invention, Jeffrey is not required to remember the various exchange rates on his credit cards. Rather, he can simply submit the information into his smart phone and be informed which card is the preferred card.

In the example, the invention assists the payer (i.e., Jeffrey) to use the preferred payment option for the particular type of transaction. Specifically, the invention accesses and analyzes the cost data and benefit data that is embedded in the payer's contracts with the financial institutions, accesses current financial account information, and selects the preferred payment option. Because of the invention, the payer does not need to remember specifics about the costs and benefits of using a specific type of payment option. Thus, payers who rarely travel, like Jeffrey, do not need to remember which payment option offers the best overall performance and/or value.

Figure 7:
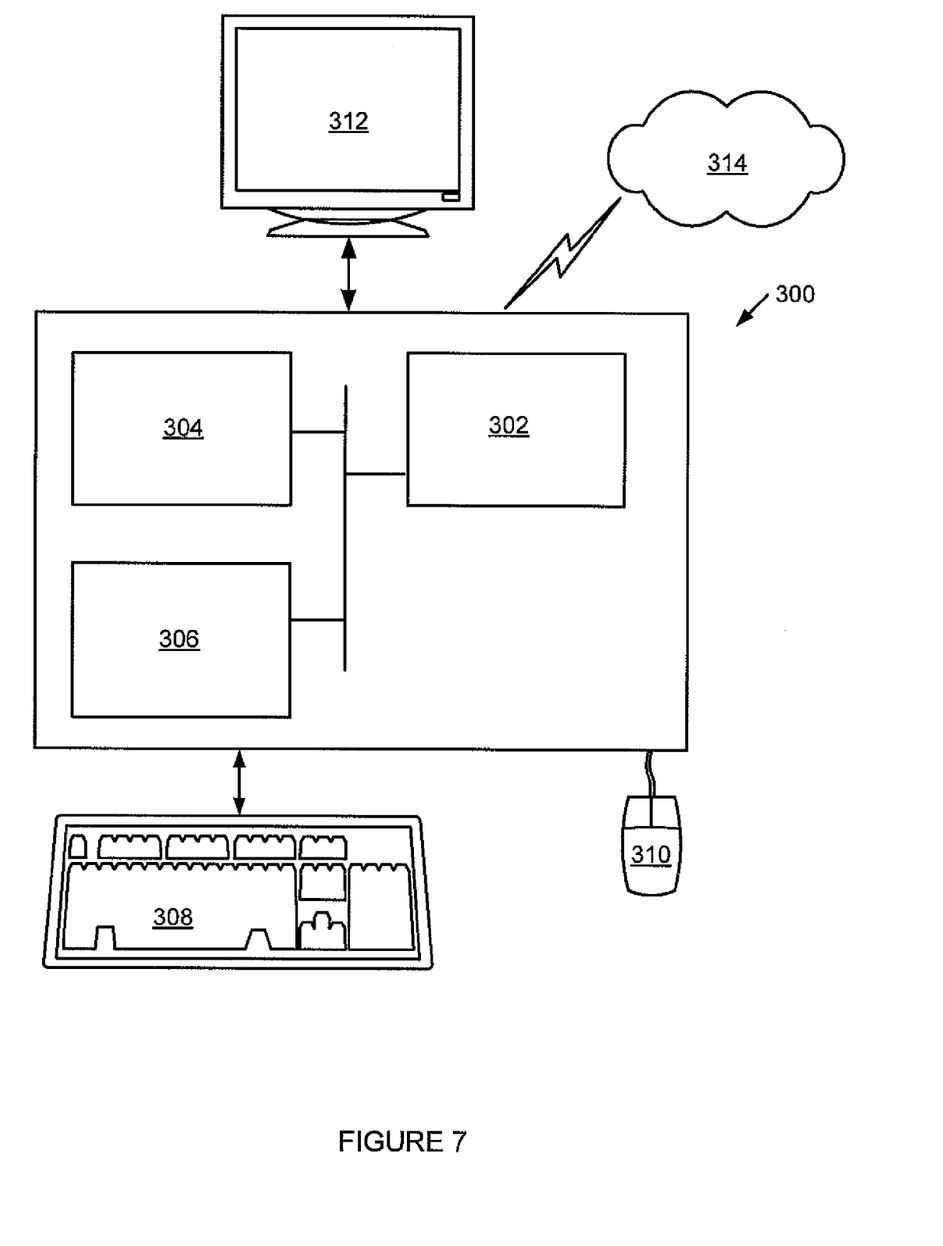
FIG. 7 shows a computer system in accordance with one or more embodiments of the invention.

Embodiments of the invention may be implemented on virtually any type of computer regardless of the platform being used. For example, as shown in FIG. 7, a computer system (300) includes one or more processor(s) (302), associated memory (304) (e.g., random access memory (RAM), cache memory, flash memory, etc.), a storage device (306) (e.g., a hard disk, an optical drive such as a compact disk drive or digital video disk (DVD) drive, a flash memory stick, etc.), and numerous other elements and functionalities typical of today's computers (not shown). The computer (300) may also include input means, such as a keyboard (308), a mouse (310), or a microphone (not shown). Further, the computer (300) may include output means, such as a monitor (312) (e.g., a liquid crystal display (LCD), a plasma display, or cathode ray tube (CRT) monitor). The computer system (300) may be connected to a network (314) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (300) includes at least the minimal processing, input, and/or output means necessary to practice embodiments of the invention.

Further, those skilled in the art will appreciate that one or more elements of the aforementioned computer system (300) may be located at a remote location and connected to the other elements over a network. Further, embodiments of the invention may be implemented on a distributed system having a plurality of nodes, where each portion of the invention (e.g., computing device, data repository, cost data and benefit data for different payment options, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing a financial transaction comprising:
    identifying, by at least one computing device, a plurality of payment options associated with a payer executing the financial transaction, wherein each of the plurality of payment options is linked to a financial account of the payer;
    gathering, by the at least one computing device, cost data and benefit data for each of the plurality of payment options, wherein the cost data comprises a cost of using the payment option for the financial transaction and the benefit data comprises a benefit, received by the payer, of using the payment option for the financial transaction;
    selecting, by the at least one computing device, a preferred payment option from the plurality of payment options for the financial transaction based on the cost data and the benefit data, wherein selecting the preferred payment option comprises:
        identifying an initial contender group comprising the plurality of payment options;
        determining whether compliance with a rule is mandatory;
        eliminating, from the contender group when compliance to the rule is mandatory, at least one payment option of the plurality of payment option based on a violation of the rule by the cost data and the benefit data for the at least one payment option to create a revised contender group;
        eliminating, from the contender group when compliance to the rule is not mandatory, the at least one payment option based on the violation of the rule to create the revised contender group when the contender group comprises a payment option of the plurality of payment options after eliminating the at least one payment option;
        generating a score for each of the plurality of payment options in the revised contender group, wherein the score is generated by comparing the cost data and the benefit data of the payment option with a selection criteria, wherein the selection criteria defines a goal of the payer, wherein generating the selection criteria comprises:
            identifying a cost of using each of the plurality of payment options during a specified type of financial transaction;

assigning a first point value to the cost based on the effect of the cost on the specified type of financial transaction;

identifying a benefit of using each of the plurality of payment options during the specified type of financial transaction;

assigning a second point value to the benefit based on the effect of the benefit on the specified type of financial transaction; and defining the selection criteria for the specified type of financial transaction by the first point value and the second point value; and selecting, as the preferred payment option, a payment option having an optimal score from the plurality of payment options in the revised contender group;

displaying the preferred payment option for the payer; and processing the financial transaction using the preferred payment option, when accepted by the payer, to obtain a transaction confirmation.

2. The method of claim 1, wherein processing the financial transaction comprises purchasing a product at a physical location of a payee.

3. The method of claim 1, wherein the cost data and the benefit data comprises at least one selected from a group consisting of payer forecasted data, financial account specific data, and payee payment option data.

4. The method of claim 3, wherein the payer forecasted data identifies a projected income of the payer and a projected expense of the payer, wherein the financial account specific data comprises a credit limit for the financial account, a current balance of the financial account, and a closing date, and wherein the payee payment option data comprises an identifier of whether the payee accepts the payment option, a transaction fee paid by the payee to use the payment option, and a payer preferred payee identifier.

5. A computer readable medium comprising computer readable program code for causing a computing device to process a financial transaction between a payer and a payee by:

identifying a plurality of payment options associated with the payer executing the financial transaction, wherein each of the plurality of payment options is linked to a financial account of the payer;

gathering cost data and benefit data for each of the plurality of payment options, wherein the cost data comprises a cost of using the payment option for the financial transaction and the benefit data comprises a benefit of using the payment option for the financial transaction;

selecting a preferred payment option from the plurality of payment options for the financial transaction based on the cost data and the benefit data, wherein selecting the preferred payment option comprises:

identifying an initial contender group comprising the plurality of payment options;

determining whether compliance with a rule is mandatory;

eliminating, from the contender group when compliance to the rule is mandatory, at least one payment option of the plurality of payment option based on a violation of the rule by the cost data and the benefit data for the at least one payment option to create a revised contender groups eliminating from the contender group when compliance to the rule is not mandatory, the at least one payment option based on the violation of the rule to create the revised contender group when the contender group comprises a payment option of the plurality of payment options after eliminating the at least one payment option;

generating a score for each of the plurality of payment options in the revised contender group, wherein the score is generated by comparing the cost data and the benefit data of the payment option with a selection criteria, wherein the selection criteria defines a goal of the payer, wherein generating the selection criteria comprises:

identifying a cost of using each of the plurality of payment options during a specified type of financial transaction;

assigning a first point value to the cost based on the effect of the cost on the specified type of financial transaction;

identifying a benefit of using each of the plurality of payment options during the specified type of financial transaction;

assigning a second point value to the benefit based on the effect of the benefit on the specified type of financial transaction; and defining the selection criteria for the specified type of financial transaction by the first point value and the second point value; and selecting, as the preferred payment option, a payment option having an optimal score from the plurality of payment options in the revised contender group; and processing the financial transaction using the preferred payment option to obtain a transaction confirmation.

6. The computer readable medium of claim 5, wherein the computing device processes the financial transaction by completing the financial transaction with the payee at a physical location of the payee.

7. The method of claim 1, wherein the rule is defined by the payer of the financial transaction.

8. The method of claim 1, wherein the rule is defined by the payee of the financial transaction.

9. The method of claim 4, wherein the cost data and the benefit data further comprises contractual data identifying a reward for using the payment option for the financial transaction, an interest rate, and an annual percentage rate.

10. The computer readable medium of claim 5, wherein the rule is defined by the payer of the financial transaction.

11. The computer readable medium of claim 5, wherein the rule is defined by the payee of the financial transaction.

12. The computer readable medium of claim 5, wherein the cost data and benefit data comprises at least one selected from a group consisting of payer forecasted data, financial account specific data, and payee payment option data.

13. The computer readable medium of claim 12, wherein the payer forecasted data identifies a projected income of the payer and a projected expense of the payer, wherein the financial account specific data comprises a credit limit for the financial account, a current balance of the financial account, and a closing date, and wherein the payee payment option data comprises an identifier of whether the payee accepts the payment option, a transaction fee paid by the payee to use the payment option, and a payer preferred payee identifier.

* * * * *